United States Patent
Dayan

(10) Patent No.: US 11,849,021 B1
(45) Date of Patent: *Dec. 19, 2023

(54) BLOCKCHAIN NODE INITIALIZATION

(71) Applicant: International Business Machines Corporation, Armonk, NY (US)

(72) Inventor: Richard Alan Dayan, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 560 days.

This patent is subject to a terminal disclaimer.

(21) Appl. No.: 17/014,978

(22) Filed: Sep. 8, 2020

Related U.S. Application Data

(63) Continuation of application No. 15/935,330, filed on Mar. 26, 2018, now Pat. No. 10,826,681.

(60) Provisional application No. 62/476,445, filed on Mar. 24, 2017.

(51) Int. Cl.
| | |
|---|---|
| *H04L 9/06* | (2006.01) |
| *G06F 16/951* | (2019.01) |
| *G06F 9/4401* | (2018.01) |
| *H04L 9/32* | (2006.01) |
| *H04L 9/40* | (2022.01) |

(52) U.S. Cl.
CPC .......... *H04L 9/0637* (2013.01); *G06F 9/4401* (2013.01); *G06F 16/951* (2019.01); *H04L 9/3247* (2013.01); *H04L 63/10* (2013.01)

(58) Field of Classification Search
CPC ..... H04L 63/10; H04L 9/3247; H04L 9/0637; G06F 9/4401; G06F 16/951
See application file for complete search history.

(56) References Cited

U.S. PATENT DOCUMENTS

| | | | | |
|---|---|---|---|---|
| 8,520,840 | B2 * | 8/2013 | Waugh | H04L 63/0442 380/282 |
| 8,898,746 | B2 * | 11/2014 | Gregg | H04L 63/083 726/4 |
| 10,230,617 | B2 * | 3/2019 | Kumar | H04L 43/12 |
| 2003/0028807 | A1 | 2/2003 | Awman et al. | |
| 2008/0062966 | A1 * | 3/2008 | den Hartog | H04L 12/66 370/352 |
| 2008/0229097 | A1 * | 9/2008 | Bangerter | H04L 9/3234 713/155 |
| 2009/0287837 | A1 * | 11/2009 | Felsher | G06F 21/6245 709/229 |
| 2011/0010543 | A1 | 1/2011 | Schmidt et al. | |
| 2015/0288694 | A1 * | 10/2015 | Liebl, III | H04L 9/3247 713/182 |
| 2016/0300234 | A1 | 10/2016 | Moss-Pultz et al. | |
| 2017/0033932 | A1 | 2/2017 | Truu et al. | |

(Continued)

OTHER PUBLICATIONS

Jarrett, Michael, and Paul Ward. "Trusted computing for protecting ad-hoc routing." 4th Annual Communication Networks and Services Research Conference (CNSR'06). IEEE, 2006. (Year: 2006).*

(Continued)

*Primary Examiner* — Syed A Zaidi

(57) ABSTRACT

A method comprises one or more of measuring metrics of a node during boot up, storing the metrics, generating a signature record from the stored metrics, and broadcasting the signature record when said node initializes a network connection.

16 Claims, 9 Drawing Sheets

(56) References Cited

U.S. PATENT DOCUMENTS

| | | |
|---|---|---|
| 2017/0041148 A1 | 2/2017 | Pearce |
| 2017/0132615 A1 | 5/2017 | Castinado et al. |
| 2017/0140145 A1 | 5/2017 | Shah |
| 2017/0301047 A1 | 10/2017 | Brown et al. |
| 2018/0089436 A1* | 3/2018 | Smith .................. H04L 9/3236 |
| 2018/0287800 A1 | 10/2018 | Chapman et al. |
| 2018/0294977 A1* | 10/2018 | Uhr ........................ G06F 21/33 |
| 2019/0140822 A1 | 5/2019 | Xie et al. |
| 2019/0166459 A1 | 5/2019 | Wootton et al. |
| 2019/0253258 A1 | 8/2019 | Thekadath et al. |
| 2019/0340379 A1 | 11/2019 | Beecham |
| 2019/0385165 A1* | 12/2019 | Castinado ............ G06Q 20/327 |
| 2020/0084223 A1 | 3/2020 | Zhang |
| 2020/0387893 A1* | 12/2020 | Maim ..................... G06F 21/51 |

OTHER PUBLICATIONS

Oberle, Alexander, et al. "Integrity based relationships and trustworthy communication between network participants." 2014 IEEE International Conference on Communications (ICC). IEEE, 2014. (Year: 2014).*

NPL Search Terms (Year: 2023).*

Dorri A, Kanhere SS, Jurdak R, Gauravaram P. Blockchain for IoT security and privacy: The case study of a smart home. In2017 IEEE international conference on pervasive computing and communications workshops (PerCom workshops) Mar. 1, 20173 (pp. 618-623). IEEE. (Year: 2017).

Yuan, Yong, and Fei-Yue Wang. "Towards blockchain-based intelligent transportation systems." 2016 IEEE 19th International Conference on Intelligent Transportation Systems (ITSC). IEEE, 2016. (Year: 2016).

* cited by examiner

BLOCKCHAIN NODE INITIALIZATION

CROSS-REFERNCE TO RELATED APPLICATIONS

This application is a continuation of U.S. application Ser. No. 15/935,330, filed Mar. 26, 2018, which claims priority to U.S. Provisional Application Ser. No. 62/476,445, which was filed on Mar. 24, 2017, the entire contents of which are hereby incorporated by reference.

FIELD

This application generally relates to blockchain, and more particularly to generating a signature record from the stored metrics and broadcasting the signature record when a node initializes a network connection.

BACKGROUND

Security of an enterprise is always a major concern to a company's livelihood or to sensitive negotiations between government. Breaches on Governments, business and individual emails, financial accounts and files are constantly in the news. Items stolen include private and/or classified emails such as those exposed by WikiLeaks. Also, stolen are passwords and other private data, i.e. Social Security Numbers and birth dates. Government officials use personal email accounts which is against government policies and laws. A famous example is Hillary Clinton as reported by several news agencies.

New technologies are being announced every day. In the past five to ten years BitCoins, a digital currency, has become popular. As copying digital files is relatively easy, new technology was required to prevent copying and unauthorized reuse of the digital currency. A technique using a technology known as blockchaining has been improved upon in order to prevent re-spending digital currency already spent or creating new digital currency without insuring the new currency was properly "mined".

Electronic devices such as a Personal Computer (PC) come with integrated security modules. One such module is known at the Trusted Platform Module (TPM) as defined by the Trusted Computing Group (TCG). On such systems, the embedded software, typical referred to as Power On Self Test (POST) or Basic I/O system (BIOS), can perform measurements of a computer or other network node and store the measurements in the PCRs of the TPM. The PCRs are digitally signed and if compromised they are self-revealing. These measurement basically define a computer or server's configuration.

Enterprises deploy local networks behind a service known as a firewall. Anyone connected on a network behind the firewall is consider an internal user. However, if someone intentionally acquires access to the private network, security may be compromised and that person can access information not intended for public consumption if stolen. Unannounced products can be exposed too early, give a competitor an unfair advantage, lead to stolen trade secrets and other unintended consequences.

SUMMARY

One exemplary embodiment teaches a method of connecting to a network in order to improve network security. The network is composed of client computers and servers. Each of the computers and servers, also known as a network node or simply node, measure metrics of their system during boot up. The metrics are stored locally. A signature record is generated from the stored metrics. The computer or server broadcasts the signature record when initializing a network connection with another computer or server. The metrics are used to identify themselves which insures the integrity of the network is composed of known computers and servers with the required software and hardware configurations. Computers and servers may also be referred to simply as a computer, unless specifically called out to be a client computer or a server.

The method further includes receiving a blockchain of signature records from other nodes attached to the network at a computer or server. The computer or server receives a broadcast signature record at the computer or server. Broadcasting a message containing the metrics when a session is established within the network. The computer or server accumulates all received broadcast messages on a predetermined schedule and extending the received blockchain. Determining if the received broadcast signature matches at least one signature record stored in the blockchain, wherein the session at the computer for which there is no corresponding record in said blockchain, based on the determining step, is immediately terminated.

Those measurements are stored in a Trusted Platform The method of claim 1 wherein the metrics are stored in the Trusted Platform Module (TPM) as defined by the Trusted Computing Group (TCG).

Another exemplary embodiment teaches a method of verifying a computer or server attempting to establish an authorized network connection. Receiving a blockchain of authorized nodes. Receiving a request by a node to establish a network connection. Receiving a signature record of the computer or server initiating a session. Determining if the received signature record matches a signature record contained in the blockchain wherein if a matching signature record is found in the blockchain, the session is initiated.

The method further comprises determining if the received signature record matches a signature record in an attached database wherein if a matching signature is found in the database, the session is initiated.

The method includes, based on the determining step, if the signature record does not match an existing record in the blockchain, terminating the network connection and broadcasting the authorized signature record on the network.

Another exemplary embodiment teaches the network is composed of client computers and servers that provide metrics to insure the integrity of the network is composed of known computers and servers with the required software and hardware configurations. Measurements are made during boot up of each individual computer or server. Those measurements are stored in a Trusted Platform module as defined by the Trusted Computing Group (TCG). A signature record is generated from the stored metrics. All signature records received during a predetermined time period are bundled into a block and broadcast to other members of the network at the predetermined broadcast time. All computers or servers on the network receive a blockchain of signature records from other nodes attached to the network. In addition, the computers and servers receive individual broadcast signature records at said computer or server. Determining if said received broadcast signature matches at least one signature record stored in said blockchain. If no corresponding record is found in said blockchain, the network connection is immediately terminated.

In one embodiment, a method comprises one or more of measuring metrics of a node during boot up, storing the metrics, generating a signature record from the stored metrics, and broadcasting the signature record when said node initializes a network connection.

In a further embodiment, a method comprises one or more of receiving a blockchain of authorized nodes, receiving a request by one of the authorized nodes to establish a network connection, receiving a signature record of a computer initiating a session, and determining if the received signature record matches a signature record contained in the blockchain wherein if a matching signature record is found in the blockchain, the session is initiated.

In yet a further embodiment, a system comprises one or more computers comprising a processor and memory, wherein the processor is configured to perform one or more of upon boot up, generate metrics, store the metrics, use the metrics to generate a signature record, and broadcast said signature records to other participating nodes on a network when initiating a network connection.

In yet a further embodiment, a non-transitory computer readable medium comprising instructions, that when read by a processor cause the processor to perform one or more of measuring metrics of a node during boot up, storing the metrics, generating a signature record from the stored metrics, and broadcasting the signature record when said node initializes a network connection.

DESCRIPTION OF PREFERRED EMBODIMENTS

Figure 1:
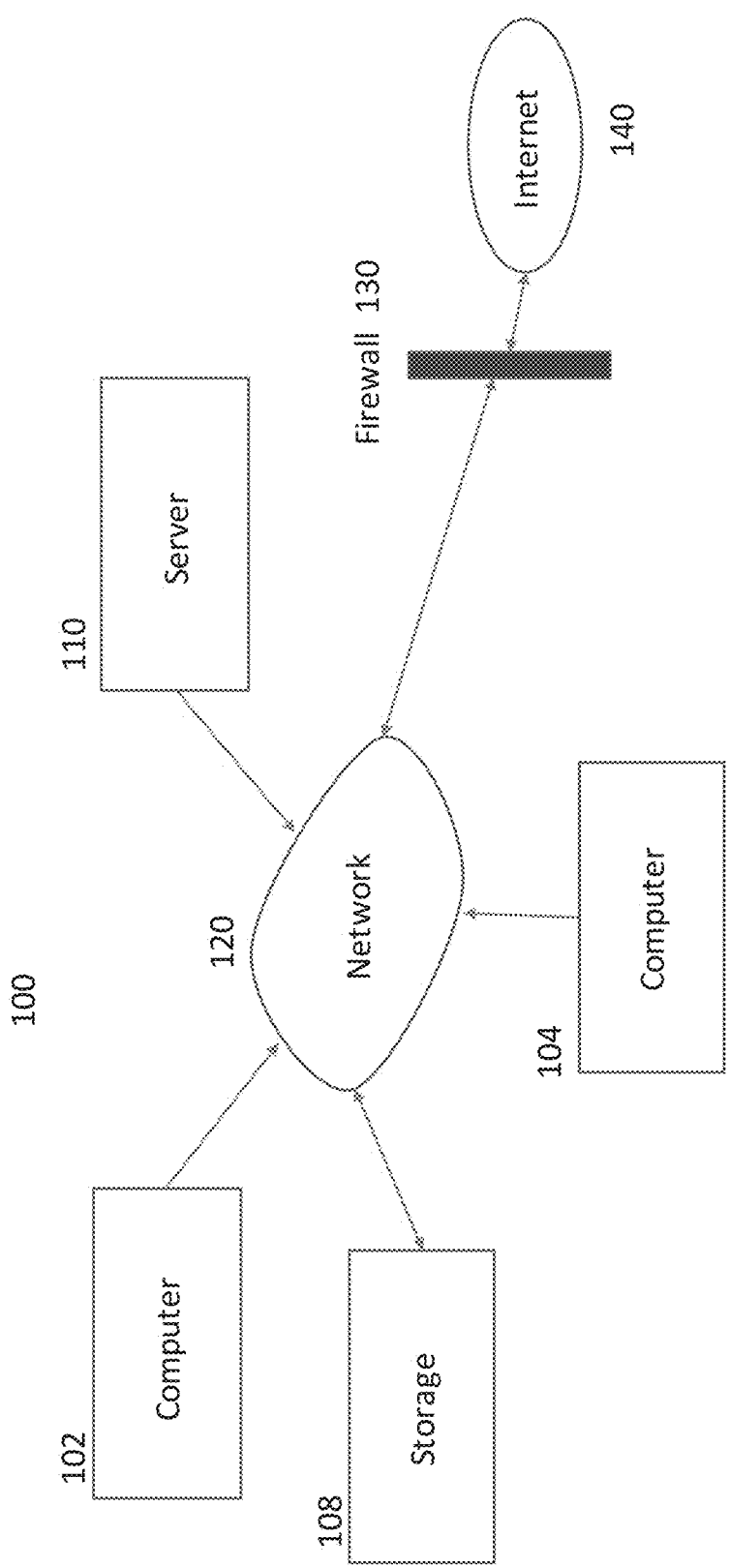
FIG. 1 is an example of the system showing a network topology of an embodiment of the present application.

FIG. 1 shows an example topology of a networked system 100 that is typical of an internal network 120 protected by a firewall service 130 from unauthorized access from the internet 140 for practicing an embodiment of this application. The internet network 140 is not intended to be limited to a single network. The internet is composed of multiple networks of different kinds. For example, a wide area network, a wireless network, a local area network (LAN), an optical network or network fabric. Connected to the internet are numerous computers, and at any time there may be well over a million actively used computers on the internet 140. Although only two computers 102, 104 and server 110 are shown, it is not intended to be limiting. For example, 50 or 100 computers 102, 104 can be attached to internal network 120. The same is true for servers 110.

There are two computers 102, 104 and server 110 shown on the internal network behind the firewall 130. The internal network 120 may be an enterprise network or a government network. The intent is that only authorized internal users or invited guests using authorized or known computers 102, 104 may connect to the internal network 120. The internal network 120 can be composed of multiple different types of networks similar to the internet. For example, internal network 120 can be composed of multiple local wired networks or multiple wireless networks or a combination of both types, not shown. Storage 108 is represented as a single network node, however, it is not meant to be limiting to a single node. There may be multiple storage 108 nodes spread across the internal network 120. In addition, each computer 102, 104 and each server 110, may have their own local storage that can be shared by any computer 102, 104 and server 110 attached to the internal network 120. Storage can be solid state storage, rotating memory such as a hard disk, optical media, database, data warehouse, RAID array, etc.

Server 110 is a computer that provides services to other computers 102, 104 and other server 110 attached to the internal network 120. There may be more than one (1) server 110 attached to the internal network 120.

A computer on the internet 140 side of the firewall 130 cannot access storage 108 unless the user tunnels behind the firewall with permission of the network administrator, for example using a virtual private network (VPN) program. However, an authorized user who has physical access to network 120 may attach an unapproved computer to network 120. Likewise, someone breaking into the facility housing the network 120 may also attach a rogue computer to the network 120 without permission. Unauthorized connections may occur on a wireless network 120, not shown, by being in close proximity to the facility housing the local network. These unauthorized connections could compromise the security of the internal network and allow unauthorized access to storage 108 which could lead to theft of intellectual property and monetary losses.

Figure 2:
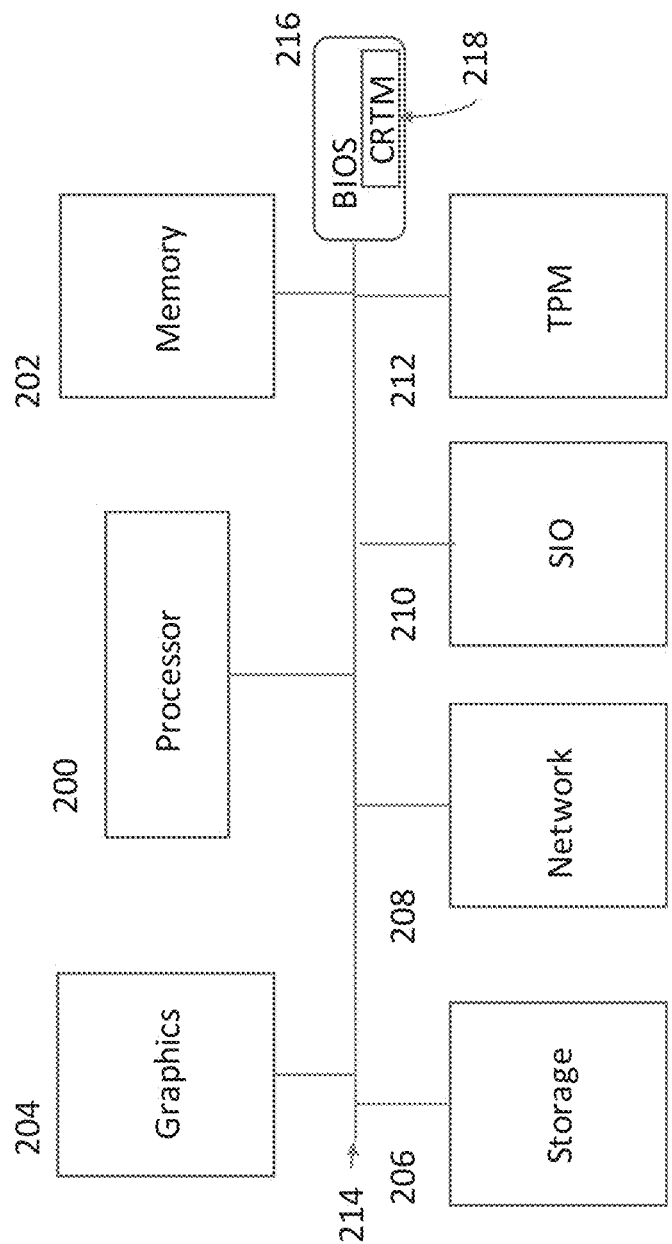
FIG. 2 is an example of a computer or server participating in an embodiment of the present application.

FIG. 2 is an example of the architecture of a computer 102, 104 or server 110 that can participate in the present embodiment. This example is not intended to be limiting as there are other computer architectures in use today that can be used in the present application. For example, a laptop or a personal computer may be attached as a client computer 102 104 or a server 110. Processor 200 is the main processor or it can be a multiprocessor core or multiple processors. Attached to the same bus 214 as the processor 200, is dynamic memory 202. In an alternate topology, the memory can be attached directly to the processor 200, not shown. Also, attached to the bus 214, is a graphic engine 204. There may be more than one graphic engine 204, not shown. There are many variations that can be made to the computer architecture of FIG. 2 by a practicing engineer of ordinary skill in the art that can also be used in the present application.

Also, attached to bus 214 are local storage 206, at least one network adapter 208, SIO chip 210, the trusted platform module (TPM) 212 and BIOS 216. These components are well known in the art and will not be described further unless new function/behavior for the present application, is required.

Figure 7:
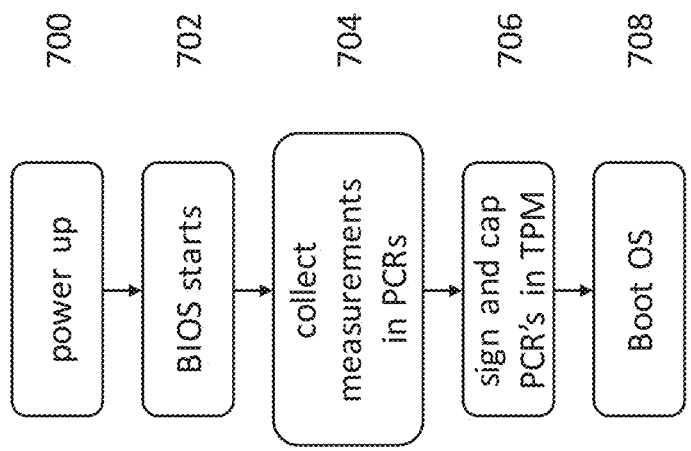
FIG. 7 shows the process of collecting computer and server measurements in an embodiment of the present application.

Referring to FIG. 7, a computer or server is initialized as described from a powered off state or a reboot of the computer from a powered-on state. The BIOS 216 contains instructions to boot or initialize computer 102, 104 and server 110. The user powers up or reboots the PC or electronic device in steps 700 and 702. With the presence of a Trusted Platform Module (TPM) 212 in each computer 102, 104 or server 110, BIOS 216 can implement the well-known Core Root of Trusted Measurement (CRTM) 218 along with support from certain mechanisms in the hardware. The CRTM 218 measures the computer system 102, 104 and server 110 or any electronic device implementing a CRTM 218. Typically, the measurements include embedded software and hardware configuration data. The measurements are placed in the platform configuration registers (PCR) internal to the TPM 212, step 704, FIG. 7. The BIOS measurement ends when control is passed to the OS boot routine. Prior to passing control to the Operating System, the CRTM 218 digitally signs the PCRs. This is known as "capping" the PCRs, step 706, FIG. 7. If desired, the OS can extend these measurements to include the OS and Applications as long as it follows the procedure to "cap" the PCRs which contain the extended measurements to insure their integrity, not shown.

Figure 4:
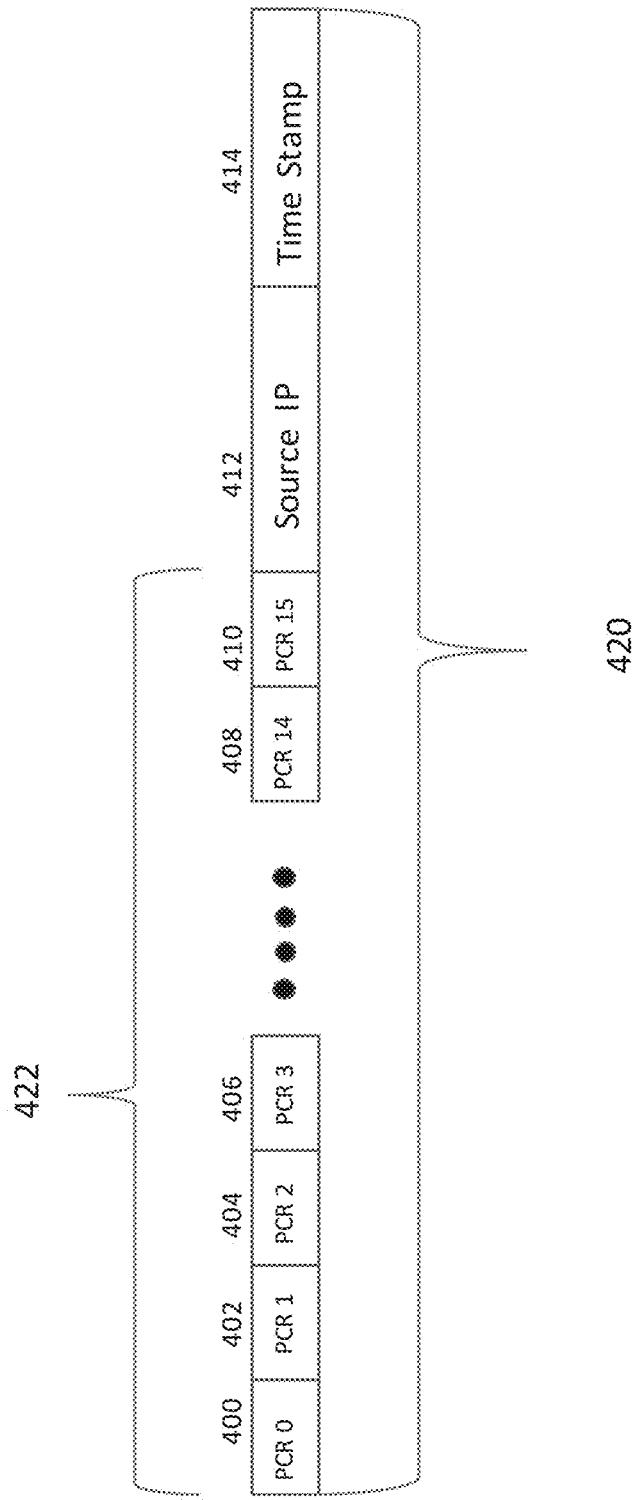
FIG. 4 shows the format of a signature record where the TPM implements 16 PCRs in an embodiment of the present application.

The PCRs belonging to a single computer 102 104 or server 110 will be read and combined into a signature records 420, see FIG. 4, to identify the device. Depending on the TPM manufacturer there may be a variable number of PCRs from TPM module 212 to TPM module 212. This will lead to the potential for different length signature records and the blocks of signature records. A computer 302, 304 or server 310 participating in the identity network of the present application must account for such variability in record lengths.

Figure 3:
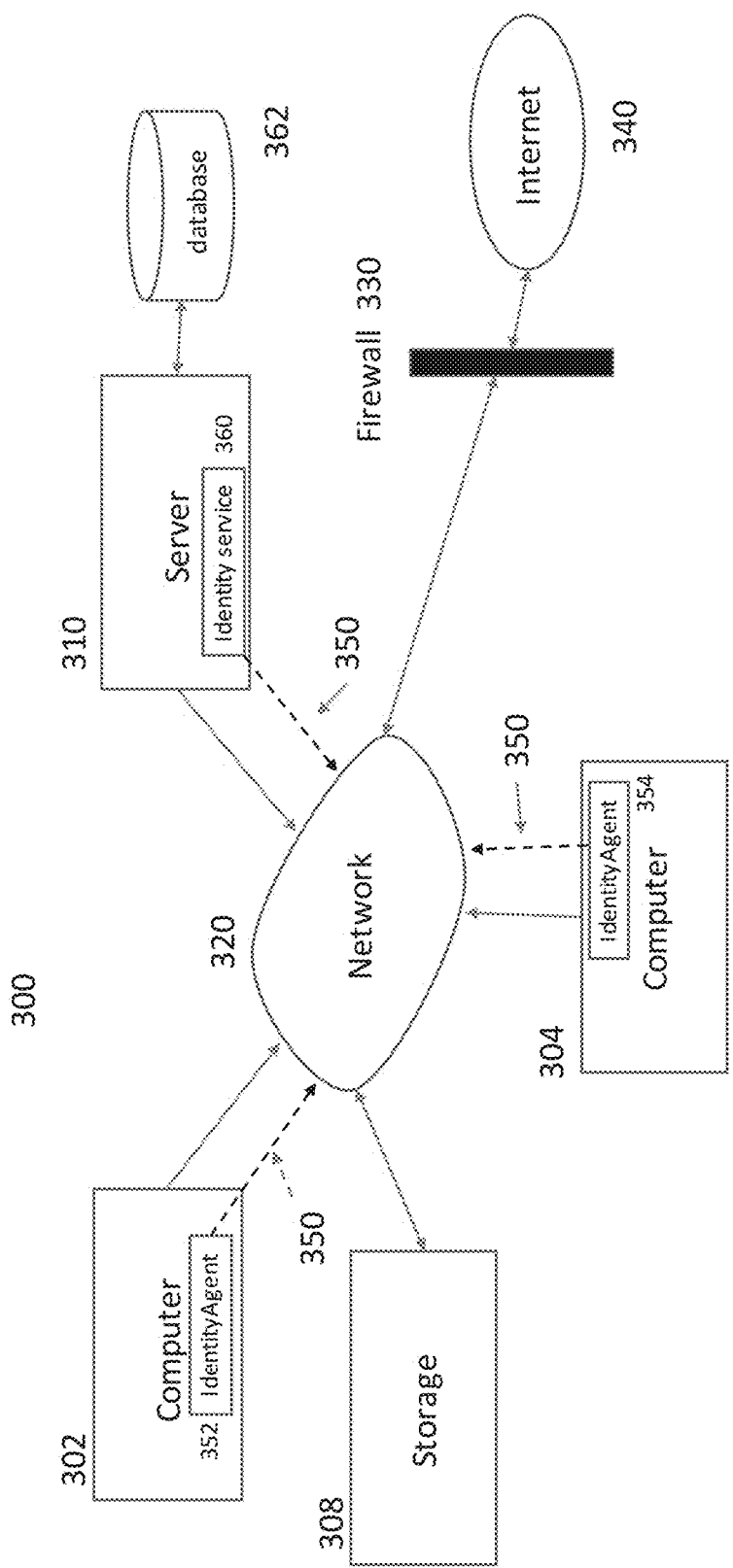
FIG. 3 is an example of the system showing the virtual identity network including identity agents and identity services in an embodiment of the present application.
Figure 5:
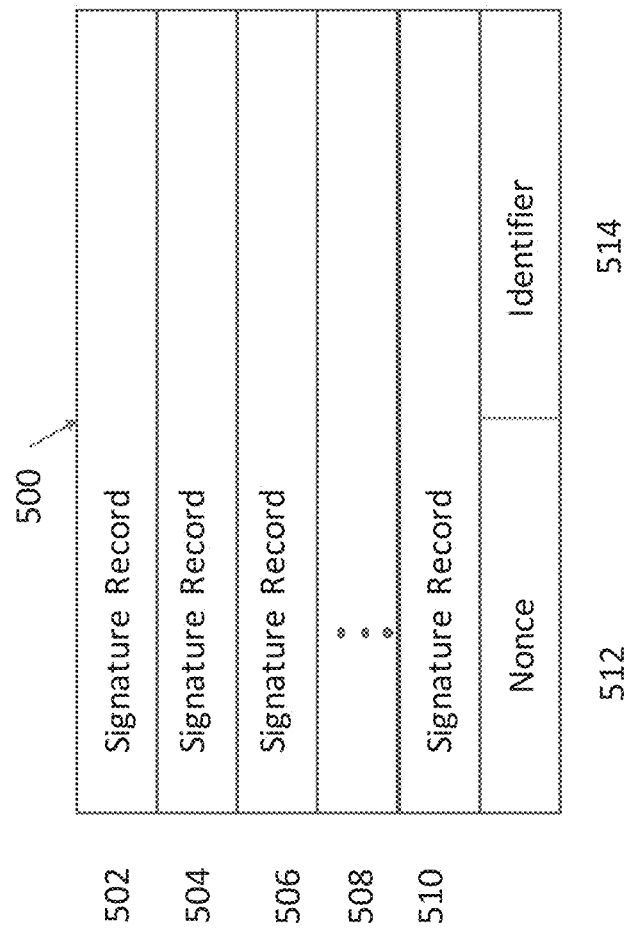
FIG. 5 shows the format of a signature record block in an embodiment of the present application.
Figure 6:
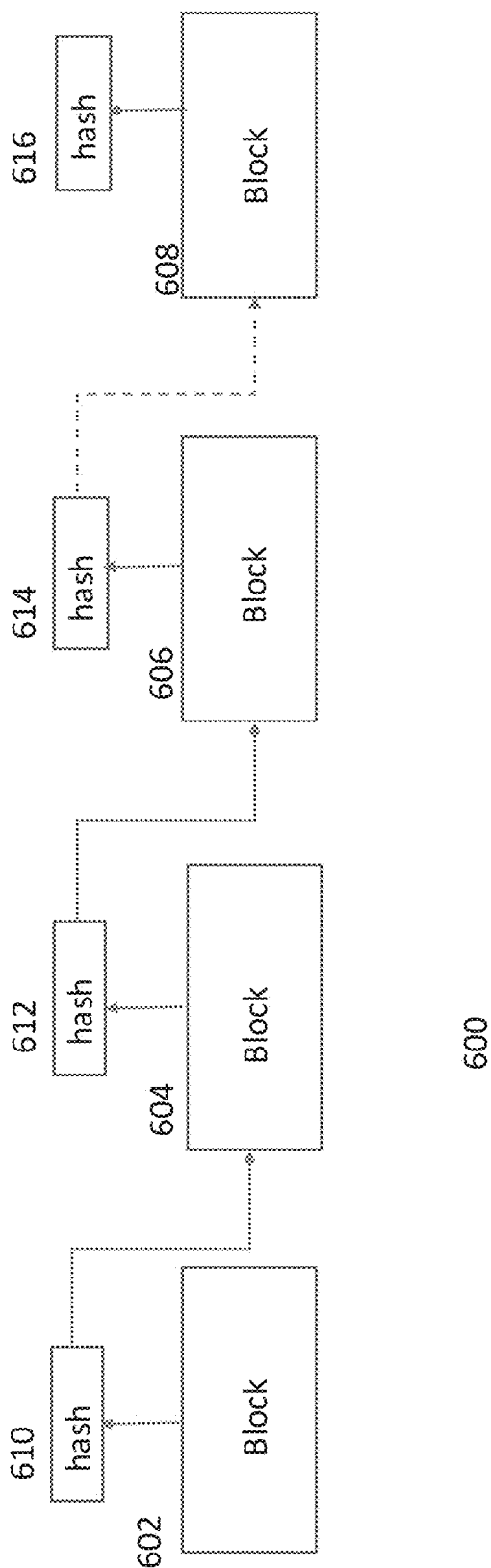
FIG. 6 shows a blockchain of signature blocks in an embodiment of the present application.

Referring to FIG. 3, each computer 302, 304 has an identity agent 352, 354 and each server 310 has an identity service. Server 310 may act as a client to another server, in this case the identity service provides the same functions as an identity agent 352, 354. All identity agents 352, 354 along with identity services 360, form a virtual identity network 350, see dashed lines. This virtual network 350 is formed by pre-designating a port number on the network. The administrator, not shown, via a console can designate the network port number to best meet the requirements of the identity network 350. Besides bundling up signature records 420, see FIG. 4, the agents 352, 354 and identity services 360 are responsible for checking each signature record for a valid signature listed in the blockchain 600, see FIG. 6, on each computer 302, 304 and in the servers 310 or the database 362 attached to server 310 prior to its inclusion in a block and being chained onto the latest chain 600 of signature record blocks 500, FIG. 5. If it is determined that a signature record 420 does not match a valid record in the blockchain at a computer 302, 304 or in the database 362 attached to server 310, the signature record is not included in the latest block to be bundled and broadcasted. The unmatched signature record is broadcast to all other agents and identity services to identify the rogue or unauthorized computer attached to the network so that an authorized computer or server will not communicate with the unauthorized computer. The same is true if a connection is started and an associated signature record 420 is not received within a specified time period on the identity network 350 at the destination of the session.

FIG. 4 shows the format of the signature record 420 for a computer with a TPM that implements 16 PCRs. If the TPM implements more than 16 PCRs, the number of PCR's in the signature record is appropriately increased. The identity network 350 is capable of handling variable length records. PCR 0 400 is the first PCR, each succeeding PCR is then followed by the next PCR and will end with PCR 15 410, the last PCR in a TPM that implements 16 PCR's. The PCR's in a signature record 420 are collectively referred to as the computers or server signature 422. Also, found in the signature record 420 is the Source IP address 412 of the computer the signature represents. The IP address can be either IPv4 or IPv6 address. A time stamp consisting of time and date is also found in the signature record 420. The time stamps can be used for statistical analysis of the network. For example, determining energy costs. It can also be used to determine the time a rogue or unauthorized computer first attached to the network which could be helpful in tracking down the computer. For example, a visitor attaches a mobile laptop to the internal network 320 without permission. The time of attachment can be compared to the visitor log to determine if a visitor potentially caused the alert.

The PCR's can be read out of the TPM by the processor 200 and placed in a record 420, see FIG. 4, to create a signature for a particular computer 302, 304 or server 310. The PCRs 422 by themselves are not unique as there can be multiple computers that can have the same signature 422 because a large company or entity computers typically use the same hardware and software configuration. This is not unusual in a large enterprise that likes to maintain as few configurations as possible to reduce maintenance costs. To make the signature records 420 unique, the IP address 412 field along with a timestamp 414 is appended to the PCRs 422 as shown in FIG. 4. Other fields can be added to signature record 420 as needed by an administrator, those optional fields are not pertinent to the application and therefore not shown or discussed.

Figure 8:
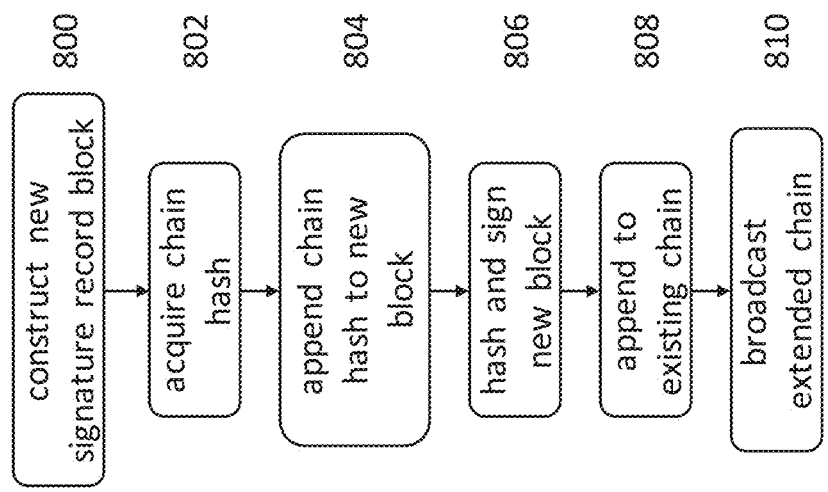
FIG. 8 shows the process of extending a blockchain in an embodiment of the present application.

Referring back to FIG. 3. is an example of the internal network 120 of FIG. 1 showing more details required to practice the present application. Described in FIG. 8 is the process used to extend the existing blockchain 600, FIG. 6, of authorized signature records 420. Each client computer 302, 304 will have an agent 352, 354 or server's 310 identity service 360 construct a block 500 of all received signature records 420 including this computer's or server's signature record 420 since the prior block 606 was added to the resident chain 600, step 800. The hash from the last block 606 on the existing blockchain 600, present in the computer 302, 304 or server 310, Step 802, will be appended to the new block 608 Step 804, prior to the new block 608 being hashed and signed, Step 806. All the blocks in internal network 320 will be hashed using an agreed upon secure hashing algorithm, e.g. SHA-1, as determined by the network administrator's security policy. The hash will be appended to the resident existing chain 600, Step 808 and the updated chain 600, including the newly added block 608, will be broadcasted to the identity network on a predetermined schedule, Step 810, by all computers 302, 304 and servers 310.

All servers 310 will have a database 362, of authorized computer 302, 304 and server 310 signatures. As new systems are incorporated into the internal network 320, a network administrator can add in a newly authorized signature which can be propagated to all servers 310 via an administrator console, not shown. New block 500 construction is based upon a predetermined time period, for example, every 5 minutes or 10 minutes. The buffer containing all recently received signature records 420, since the last block was signed and added to the chain, is checked against the known signature database 362.

Referring back to FIG. 4, the IP address 412 of the computer represented by the signature is attached to each individual signature record 420. Those signatures not in the approved list are sent to an authorized administrator to make a determination if the unknown computer is authorized to participate on the local network 320 or should be tracked down and removed from the network 320. The client computers attempting a connection without broadcasting a signature record 420 are treated the same way as an unrecognized signature record 520. The administrator can enable alerts such that any terminal without an agent 352, 354 will cause an immediate notification to be sent to both the administrator and site security to be dealt with appropriately according to the established security plan.

The known signatures are compiled in to a single block 500. See FIG. 5. Each signature record 420 is collected by placing each known signature record in the new block 608. For example, new block 608 consists of verified signature records 420 in the order received. For example, slot 502, 504, 506 up until the last record 510 received in the pre-defined time period. The number of records shown is non-limiting as the number of records received depends on the number of participating nodes connected on the internal network. Also, found in the block 500 is a cryptographic nonce 512, typically a random number used to enhance security and prevent replay attacks. An identifier can also be included to identify the chain 600 as containing authorized signatures. Similarly, this field could be used to identify a chain of unauthorized computers and servers attached to the network. Likewise, the administrator may add certain fields of their choosing, for example a timestamp, not shown, to enhance the use of the chain which are not discussed or shown in FIG. 5.

A chain 600 of prior blocks is present at both the servers 310 and computers 302, 304. The hash of the last block 606 is included in the hash of the new block 608 about to be added to the chain. A hash of the new block 608 is taken of the new block 608 including the hash from the existing block 606, at the end of the chain where the newly signed block 608 will be added onto the existing chain 600. Thus, the updated chain of signature record blocks provides added protection to the entire chain 600 by including not only the prior blockchain's hash that represents all authorized signature records 420 of computers 302, 304 and servers 310 actively connected to the network 320 but now includes the signature records 420 of the newly attached block 608. Each attached block 500 included in the hash makes it computationally more difficult to create a rogue chain for use in the identity network 350.

Figure 9:
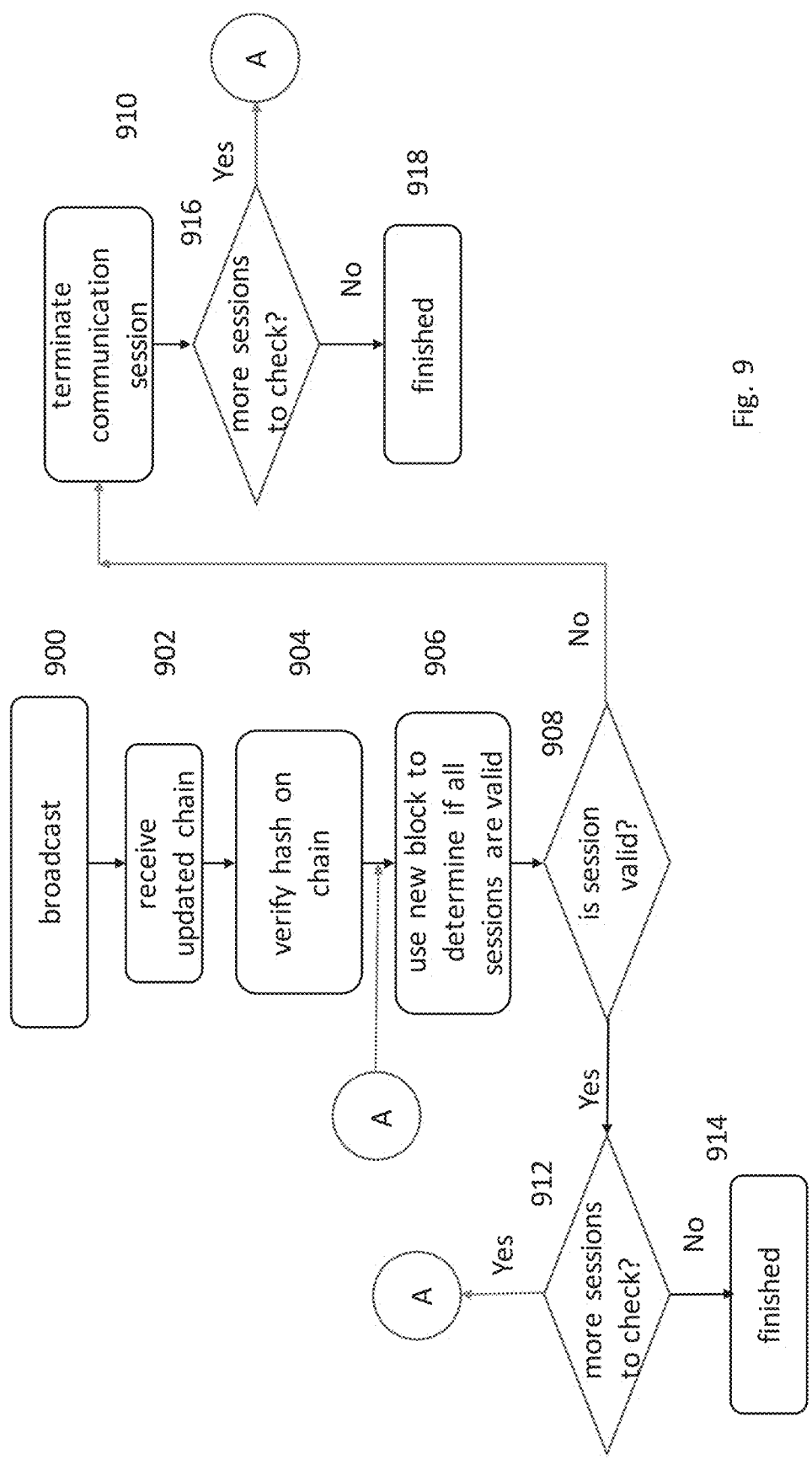
FIG. 9 shows the process of checking if an network system is authorized for communications on a network in an embodiment of the present application.

Shown in FIG. 9 is the process carried out by an identity agent, 352 or an identity service 360. The chain 600 along with the new block 608 is then broadcast to the identity network participants, Step 900. The updated chain, including new block 608, of signatures is received, Step 902. The new block is used by all computers 302, 304 and servers 310 to verify authorized computers 302, 304 or servers 310. First each computer 302, 304 and server 310 checks the hash of the newly received chain 600, step 904. If valid, the chain is used by the computer 302, 304 and server 310 to check that all existing communication sessions are with authorized computers 302, 304 and servers 310 in order to make a determination to continue communications. If not valid, the chain is discarded and the prior received chain is used until a new chain 600 is received. After the hash is validated, the signature records 420 contained in the new block 608 are individually checked against all valid sessions to see if all communication sessions are with authorized computers, Step 906, FIG. 9. If a computer 302, 304 or server 310 involved in a communication session with a computer 302, 304 or server 310 for which there is no matching signature record 420 or a valid signature in the valid signature database 362, Step 908, the session is immediately terminated, Step 910. A further check is made to make sure all sessions are checked, Step 916. If no more sessions are active to check, the identity service is finished and returns to monitor the identity network for more transmissions, Step 918. If further sessions are to be checked, the process continues back at step 906. Referring back to Step 908, FIG. 9, if a session is valid, matches a signature record in the chain 600, a further check is made to insure all sessions have been checked, Step 912. If no more sessions are active to check, the identity service is finished and returns to monitor the identity network for more transmissions, Step 914. If further sessions are to be checked, the process continues back at step 906.

Care must be taken to control the predetermined update time period as the network traffic created on the internal network 320 will impact the network throughput. For example, the administrator owning the internal network 320 can pre-specify a time period for updating of the chain 600. This can occur periodically, for example, at a predetermined time period or the updates can be configured in a file in order to allow variable changes in the resolution periods throughout the day. For example, during the hours of 8 a.m. and 10 a.m., the updating of the chain could be set to occur every 5 minutes. However, from 10 a.m. until 5 p.m., updates could occur every 10 minutes. From 5 p.m. until 10 p.m. updates could occur every 20 minutes, etc. The security of the blockchain 600 is based upon the time period used to generate an updated chain 600. The more frequent the chain is refreshed, the more difficult it becomes for a rogue computer to replicate the chain with fraudulent data. However, the more frequent the chain 600 is updated, the more network traffic experienced.

When a computer establishes a connection with a server 310 on the internal network 320, the agent 352, 354 in the computer 302, 304 broadcasts the signature record 420 during session initiation onto the identity network 350. It is broadcasted to the identity network 350 on the predetermined port number. Those servers 310 and client computers 302, 304, listening on the identity network, receive the broadcast signature record. All internal network 320 resident servers 310 and client computers 302, 304 will receive the recently broadcast signature record 420 and save it in a buffer in memory for later processing in order for building and adding a new block 608 to the chain 600. The buffer may be stored in local memory 202 or on local storage 206. Not all nodes on the internal network 320 will receive all signature records 420. Also, signature records 420 will be prevented from passing through the Firewall 330 to the internet 340 unless an authorized client computer 302 304 is tunneling through the firewall via a VPN and then it will be treated as though it is behind the company or entity's firewall 330.

Each identity agent 352, 354 along with identity service 360, form a virtual identity network, see dashed lines in FIG. 3. This virtual network is formed by pre-designating a port number on the network. The administrator, not shown, via a console can designate the network port number to best meet the requirements of the network. Besides bundling up signature records 420, see FIG. 4, the identity agents 352, 354 and identity services 360 are responsible for checking each signature record 420 for a valid signature listed in the blockchain 600 on each computer 302, 304. Servers 310 check each record received against both the records in the blockchain 600 and in the database 362 attached to server 310 prior to its inclusion in a block and being chained onto the latest chain 600 of signature record blocks. If it is determined that a signature record 420 does not match a valid record in the blockchain at a computer 302, 304 or in the database 362 attached to server 310, the signature record is not included in the latest block to be bundled and broadcasted. The unmatched signature record is broadcast to all other identity agents 352, 354 and identity services 360 to identify the rogue or unauthorized computer attached to the network so that an authorized computer 302, 304 or server 310 will not communicate with the unauthorized computer. The same is true if a connection is started and an associated signature record 420 is not received at the destination of the session within a specified time period on the identity network 350.

Referring back to FIG. 3, the identity service 360 on server 310 can be configured to trim the chain by removing blocks over a pre-determined amount of time. The server 310 can store the trimmed blocks for later processing in storage 308 or any other designated storage facility as per the facility's security policy. For example, after eight (8) hours, all older blocks can be removed from the chain. Only identity services at servers 310 can perform trimming. When a computer 302, 304 receives a trimmed chain, it replaces its current chain with the trimmed chain to cut down on network bandwidth usage to reduce any performance implications by continually transmitting the longer chain for days at a time without trimming.

What is claimed is:

1. A method, comprising:
   generating a signature record from metrics related to a node during boot up;
   determining the signature record does not match any signature record stored in a storage area of a network;
   broadcasting the signature record after the node initializes a connection in the network;
   receiving, by the node, a blockchain of signature records from nodes attached to the network;
   receiving, by the node, a broadcast signature record from other nodes; and
   broadcasting a message containing the metrics after a session is established within the network.

2. The method of claim 1, comprising:
   accumulating all received broadcast messages on a predetermined schedule and extending the received blockchain; and
   determining that the received broadcast signature does not match at least one signature record stored in the blockchain, the blockchain corresponding to the storage area of the network.

3. The method of claim 2, comprising terminating the session at the node for which there is no corresponding record in the blockchain, based on the determining.

4. The method of claim 1, wherein:
   the metrics are stored in a Trusted Platform Module (TPM), and
   the broadcasting includes broadcasting the signature record to one or more other nodes to notify the one or more other nodes that the signature record corresponds to an unauthorized computer.

5. A method, comprising:
   receiving a request by one of a plurality of authorized nodes to establish a network connection;
   receiving a signature record of a computer requesting initiation of a session;
   determining that the received signature record does not match a signature record contained in the blockchain;
   determining that the received signature record matches a signature record in a blockchain of the authorized nodes based on the determining that the received signature record does not match a signature record contained in the blockchain; and
   initiating the session.

6. The method of claim 5, comprising:
   based on determining that the signature record does not match a signature record in the blockchain, terminating the network connection and broadcasting the signature record as an unauthorized signature record on the network.

7. The method of claim 5, comprising:
   checking an attached database to determine whether the received signature record matches a signature record in the attached database; and
   based on determining that the received signature record does not match a signature record in the attached database, terminating the network connection and broadcasting the signature record as an unauthorized signature record on the network.

8. A system, comprising:
   one or more nodes comprising a processor and memory, wherein the processor is configured to:
   generate a signature record from metrics related to a node during boot up;
   determine the signature record does not match any signature record stored in a storage area of a network; and
   broadcast the signature record after the node initializes a connection in the network;
   receive a blockchain of signature records from nodes attached to the network;
   receive a broadcast signature record from other nodes; and
   broadcast a message containing the metrics after a session is established within the network.

9. The system of claim 8, comprising:
   accumulate all received broadcast signature records during a predetermined period; and
   generate a new block in order to extend the received blockchain at an end of the predetermined period using the signature records received during the predetermined period including the signature record corresponding to the node.

10. The system of claim 8, wherein the processor is configured to:
    extend the blockchain;
    transmit the extended blockchain; and
    determine that the received broadcast signature record matches at least one signature record stored in the blockchain, the storage area of the network corresponding to the blockchain.

11. The system of claim 8, wherein the processor is configured to:
    terminate a session with the one or more nodes based on a determination that there is no corresponding matching record in a blockchain corresponding to the storage area of the network.

12. The system of claim 8, wherein the processor is configured to:
    determine that the signature record matches a signature record in an attached database and to initiate a session, wherein the attached database corresponds to the storage area of the network.

13. The system of claim 8, wherein the processor is configured to:

determine that the signature record does not match an existing record in a blockchain which corresponds to the storage area of the network, terminate the network connection, and broadcast the signature record as an unauthorized signature record on the network.

14. A non-transitory computer readable medium comprising instructions that when executed by a processor cause the processor to perform:

generating a signature record from metrics related to a node during boot up;

determining the signature record does not match any signature record stored in a storage area of a network;

broadcasting the signature record after the node initializes a connection in the network;

receiving a blockchain of signature records from nodes attached to the network;

receiving a broadcast signature record from other nodes; and broadcasting a message containing the metrics after a session is established within the network.

15. The non-transitory computer readable medium of claim 14, wherein the instructions further cause the processor to perform:

accumulating all received broadcast messages on a predetermined schedule and extending the received blockchain; and determining the broadcast signature matches at least one signature record stored in the blockchain, the blockchain corresponding to the storage area of the network.

16. The non-transitory computer readable medium of claim 15, wherein the instructions further cause the processor to perform;

terminating the session at the node for which there is no corresponding record in the blockchain, based on the determining.

* * * * *